(12) United States Patent
Manohar et al.

(10) Patent No.: US 8,892,815 B2
(45) Date of Patent: Nov. 18, 2014

(54) OPTIMIZED FRAGMENTED BLOCK COMPACTION WITH A BITMAP

(75) Inventors: Abhijeet Manohar, San Jose, CA (US); Venkata Krishna Nadh Dhulipala, Fremont, CA (US)

(73) Assignee: SanDisk Technologies Inc., Plano, TX (US)

( * ) Notice: Subject to any disclaimer, the term of this patent is extended or adjusted under 35 U.S.C. 154(b) by 246 days.

(21) Appl. No.: 13/614,211

(22) Filed: Sep. 13, 2012

(65) Prior Publication Data

US 2014/0075095 A1     Mar. 13, 2014

(51) Int. Cl.
*G06F 12/00*     (2006.01)

(52) U.S. Cl.
USPC .................................. 711/103; 711/E12.069

(58) Field of Classification Search
USPC ......................................................... 711/103
See application file for complete search history.

(56) References Cited

U.S. PATENT DOCUMENTS

| 6,175,900 | B1 | 1/2001 | Forin et al. |
| 7,647,468 | B2 | 1/2010 | Leis et al. |
| 2007/0203909 | A1* | 8/2007 | Marathe ............................ 707/7 |
| 2011/0099326 | A1* | 4/2011 | Jung et al. ..................... 711/103 |

* cited by examiner

*Primary Examiner* — Reginald Bragdon
*Assistant Examiner* — Hamdy S Ahmed
(74) *Attorney, Agent, or Firm* — Brinks Gilson & Lione (57) ABSTRACT

A memory system may include an optimized data compaction algorithm. The compaction may include transferring only valid data from a source block to a destination block. A compaction bitmap that is maintained in random access memory ("RAM") may be populated during the compaction process. The populated bitmap may be used to copy valid fragments to the destination block.

20 Claims, 9 Drawing Sheets

Invalid Fragments

| 1 | 1 | 1 | 1 |
|---|---|---|---|
| 1 | 0 | 1 | 1 |
| 1 | 1 | 1 | 1 |
| 1 | 1 | 0 | 1 |
| 0 | 0 | 1 | 1 |

| Blue | Yellow | Yellow | Green |
| Blue | Red | Blue | Green |
| Yellow | Purple | Purple | Blue |
| Blue | Blue | Yellow | Blue |
| Green | Red | Red | Green |

| 1 |   |   |   |
|   | 1 |   |   |
|   |   |   | 1 |
| 1 | 1 |   | 1 |
|   |   |   |   |

Blue Control Page Processed

| 1 | 1 | 1 |   |
|---|---|---|---|
| 1 |   | 1 |   |
| 1 |   |   | 1 |
| 1 | 1 |   | 1 |
|   |   |   |   |

Yellow Control Page Processed

| 1 | 1 | 1 | 1 |
|---|---|---|---|
| 1 |   | 1 | 1 |
| 1 |   |   | 1 |
| 1 | 1 |   | 1 |
|   |   |   | 1 |

Green Control Page Processed

| 1 | 1 | 1 | 1 |
|---|---|---|---|
| 1 |   | 1 | 1 |
| 1 |   |   | 1 |
| 1 | 1 |   | 1 |
|   |   | 1 | 1 |

Red Control Page Processed

| 1 | 1 | 1 | 1 |
|---|---|---|---|
| 1 |   | 1 | 1 |
| 1 | 1 | 1 | 1 |
| 1 | 1 |   | 1 |
|   |   | 1 | 1 |

Purple Control Page Processed

| Blue | Yellow | Yellow | Green |
| --- | --- | --- | --- |
| Blue | Blue | Green | Yellow |
| Purple | Purple | Blue | Blue |
| Blue | Blue | Red | Green |
| Empty | Empty | Empty | Empty |

Destination Block

US 8,892,815 B2

OPTIMIZED FRAGMENTED BLOCK COMPACTION WITH A BITMAP

TECHNICAL FIELD

This application relates generally to memory devices. More specifically, this application relates to data compaction in non-volatile semiconductor flash memory.

BACKGROUND

Block compaction of a flash memory data block is an operation through which only valid data is copied over to a new block by the discarding the invalid data. In other words, allocated objects are moved together, while empty space is left together. Block compaction may also be referred to as memory compaction or storage allocation and refers to the relocation of information blocks in memory in order to maximize the available free space in the memory. Block compaction may be an expensive operation in terms of processing and memory requirements. Inefficient memory compaction algorithms may result in additional processing cycles being required, which result in an overall slowing down of the system's write performance. For example, a baseline method for fragmented block compaction may be to proceed fragment by fragment in the source block, sense/read a corresponding control page to decipher the state of the fragment (e.g. valid or invalid) and copy them over to the destination block. This method may require multiple senses of the page and as many data transfers/toggles as there are fragments in the block.

SUMMARY

It may be desirable to optimize block compaction of a flash memory system. A block compaction algorithm may be optimized by using a compaction bitmap that maintains a one-to-one correspondence with fragments from a source block and indicates when the fragments are valid or invalid. The compaction bitmap may be maintained in random access memory ("RAM") may be populated during the compaction process. The populated bitmap may be used to copy valid fragments to a destination block. The optimization may consider which fragments are best to use to populate the bitmap (e.g. least filled bitmap rows are populated first) and only those fragments that have not been populated are considered. The compaction bitmap may be maintained until the transfer to the destination block.

BRIEF DESCRIPTION OF THE PRESENTLY PREFERRED EMBODIMENTS

Compaction of a flash memory data block is an operation through which only valid data is copied over to a new block by the discarding the invalid data. The goal of compaction may be to eliminate invalid data in order to free up additional space in the memory. For example, in a 4 kilobyte ("KB") page based architecture, for a block that is fairly fragmented, each 4 KB fragment might be addressed by a different control page. A control page may be an index table for a memory block or memory blocks that maps the storage of valid data. The page may include a different size and 4 KB is merely exemplary as a minimum unit of use. Depending upon which compaction algorithm is chosen, each page in the block may be sensed multiple times, a control page sense or read may be made for each fragment and all the individual fragments within a block may need to be processed to find out which control page addresses that fragment and whether the fragment is valid or invalid. Sensing may utilize a sense amplifier and includes reading data into a flash latch rather than transferring the data out. For example, a 16 KB page of data may be sensed, but 8 KB may be transferred out.

Compaction may identify and pull together all the valid data for a block. Conversely, defragmentation includes pulling together logically related data. Accordingly, the compaction process described herein includes identifying valid data from a source block that can be transferred to a destination block. The destination block may then only include valid data. This compaction can be optimized using a bitmap based algorithm. The bitmap based optimization algorithm may utilize an algorithm that optimizes the number of senses required on a page, as well as the number of control page senses plus transfers and the number of fragments that are processed during fragmented block compaction. A reduction in the number of senses and transfers improves efficiency of the memory device by reducing the processing load. As described, the locality or physical locations of data stored in memory from the access patterns for that data is leveraged for reducing the senses/transfers for this optimization. In other words, the number of senses between different control pages is reduced.

A transfer of data from a source block to a destination block only requires a transferring of valid or current data from the source block. Accordingly, it may be necessary to recognize which fragments in the source block include valid data and only that data is transferred. The bitmap is one embodiment of a mechanism through which valid data is identified and recorded. The bitmap may indicate which fragments are valid so that only those fragments are transferred. Likewise, the bitmap may indicate which fragments include invalid data so that data is not transferred.

Figure 1:
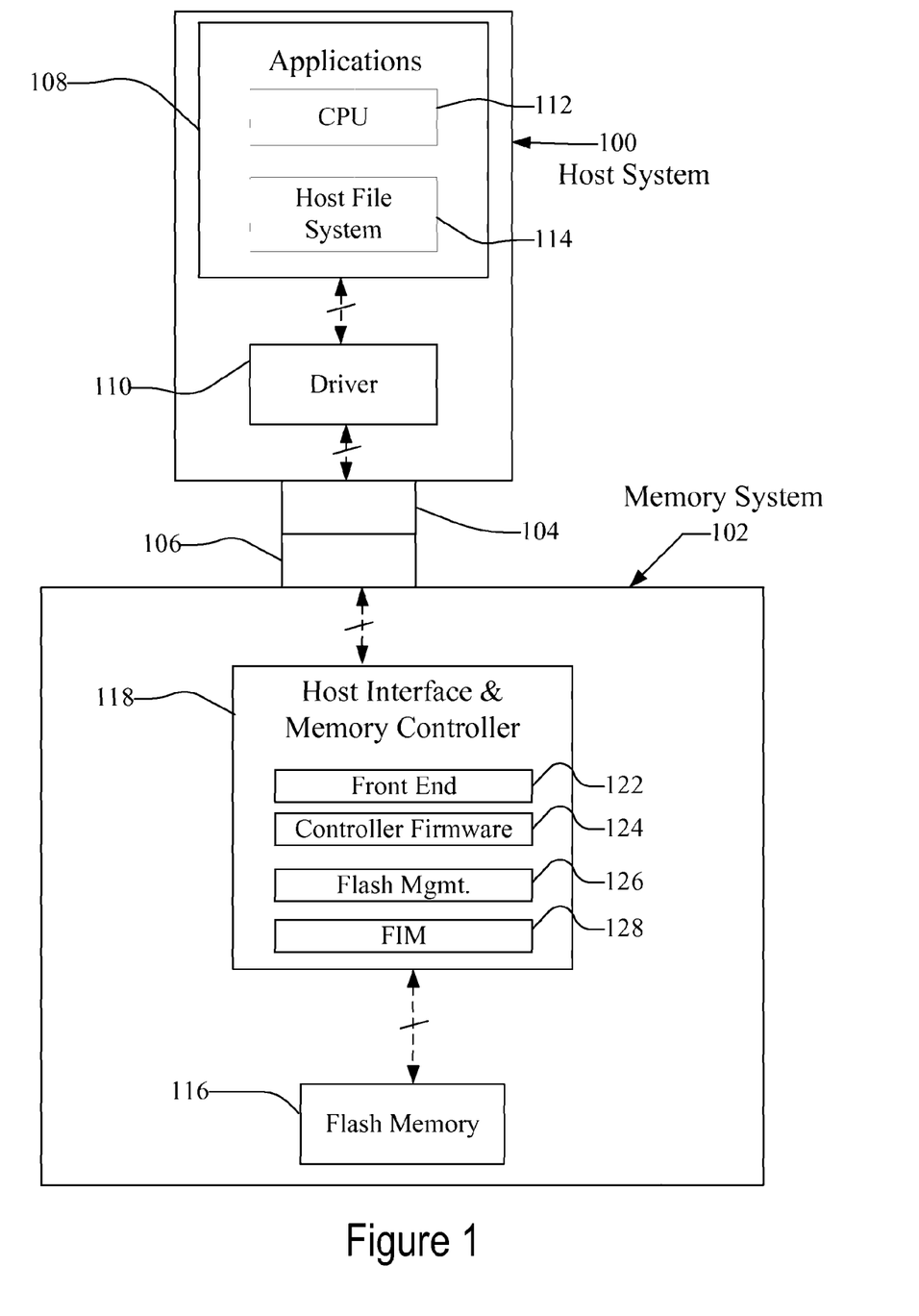
FIG. 1 is a block diagram of a host connected with a memory system having non-volatile memory.
Figure 2:
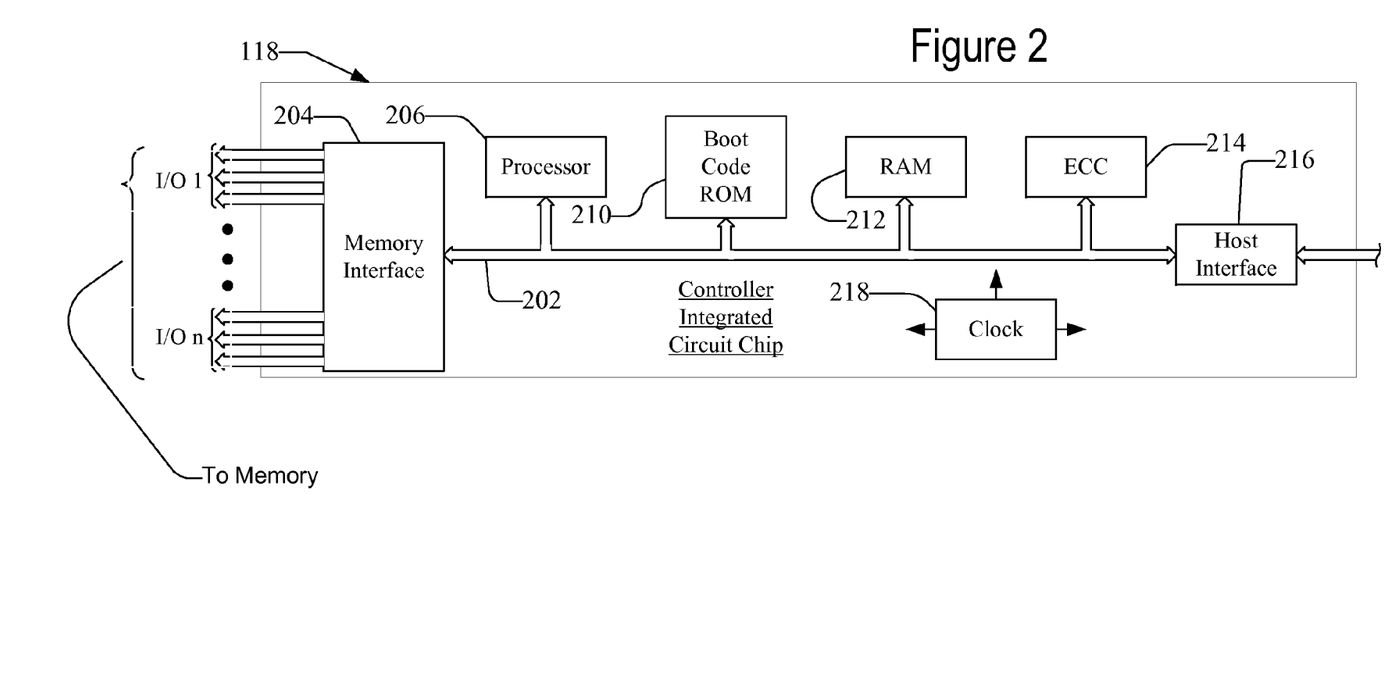
FIG. 2 is a block diagram of an exemplary flash memory system controller for use in the system of FIG. 1.
Figure 3:
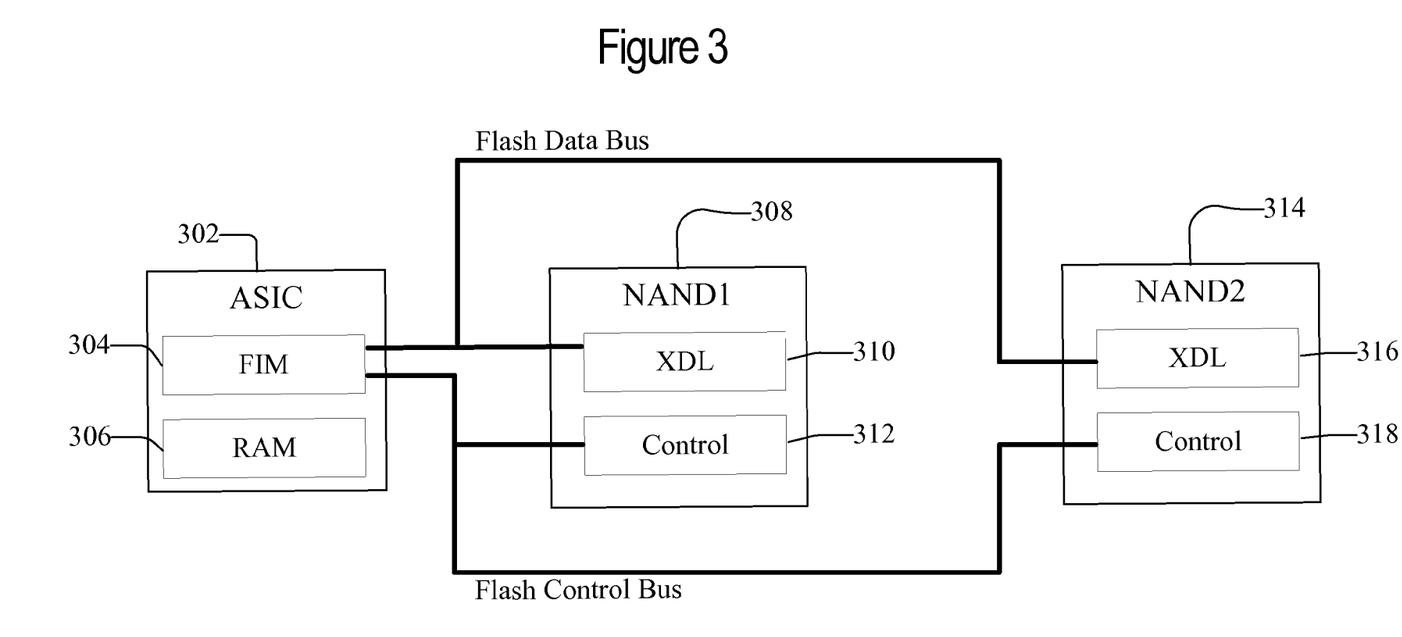
FIG. 3 is a block diagram of an alternative memory communication system.

A flash memory system suitable for use in implementing aspects of the invention is shown in FIGS. 1-3. A host system 100 of FIG. 1 stores data into and retrieves data from a flash memory 102. The flash memory may be embedded within the host, such as in the form of a solid state disk (SSD) drive installed in a personal computer. Alternatively, the memory 102 may be in the form of a flash memory card that is removably connected to the host through mating parts 104 and 106 of a mechanical and electrical connector as illustrated in FIG. 1. A flash memory configured for use as an internal or embedded SSD drive may look similar to the schematic of FIG. 1, with one difference being the location of the memory system 102 internal to the host. SSD drives may be in the form of discrete modules that are drop-in replacements for rotating magnetic disk drives.

Examples of commercially available removable flash memory cards include the CompactFlash (CF), the MultiMediaCard (MMC), Secure Digital (SD), miniSD, Memory Stick, SmartMedia, TransFlash, and microSD cards. Although each of these cards may have a unique mechanical and/or electrical interface according to its standardized specifications, the flash memory system included in each may be similar. These cards are all available from SanDisk Corporation, assignee of the present application. SanDisk also provides a line of flash drives under its Cruzer trademark, which are hand held memory systems in small packages that have a Universal Serial Bus (USB) plug for connecting with a host by plugging into the host's USB receptacle. Each of these memory cards and flash drives includes controllers that interface with the host and control operation of the flash memory within them.

Host systems that may use SSDs, memory cards and flash drives are many and varied. They include personal computers (PCs), such as desktop or laptop and other portable computers, tablet computers, cellular telephones, smartphones, personal digital assistants (PDAs), digital still cameras, digital movie cameras, and portable media players. For portable memory card applications, a host may include a built-in receptacle for one or more types of memory cards or flash drives, or a host may require adapters into which a memory card is plugged. The memory system may include its own memory controller and drivers but there may also be some memory-only systems that are instead controlled by software executed by the host to which the memory is connected. In some memory systems containing the controller, especially those embedded within a host, the memory, controller and drivers are often formed on a single integrated circuit chip.

The host system 100 of FIG. 1 may be viewed as having two major parts, insofar as the memory 102 is concerned, made up of a combination of circuitry and software. They are an applications portion 108 and a driver portion 110 that interfaces with the memory 102. There may be a central processing unit (CPU) 112 implemented in circuitry and a host file system 114 implemented in hardware. In a PC, for example, the applications portion 108 may include a processor 112 running word processing, graphics, control or other popular application software. In a camera, cellular telephone or other host system 114 that is primarily dedicated to performing a single set of functions, the applications portion 108 includes the software that operates the camera to take and store pictures, the cellular telephone to make and receive calls, and the like.

The memory system 102 of FIG. 1 may include non-volatile memory, such as flash memory 116, and a system controller 118 that both interfaces with the host 100 to which the memory system 102 is connected for passing data back and forth and controls the memory 116. The system controller 118 may convert between logical addresses of data used by the host 100 and physical addresses of the flash memory 116 during data programming and reading. Functionally, the system controller 118 may include a front end 122 that interfaces with the host system, controller logic 124 for coordinating operation of the memory 116, and flash management logic 126 for internal memory management operations. There may also be one or more flash interface modules (FIMs) 128 or memory interfaces to provide a communication interface between the controller with the flash memory 116.

The system controller 118 may be implemented on a single integrated circuit chip, such as an application specific integrated circuit (ASIC) such as shown in FIG. 2. The processor 206 of the system controller 118 may be configured as a multi-thread processor capable of communicating via a memory interface 204 having I/O ports for each memory bank in the flash memory 116. The system controller 118 may include an internal clock 218. The processor 206 communicates with an error correction code (ECC) module 214, a RAM buffer 212, a host interface 216, and boot code ROM 210 via an internal data bus 202. The RAM 212 may be a static random-access memory ("SRAM") in which a compaction bitmap is stored. The bitmap may be generated and stored in SRAM and may be discarded after it is used for transferring data from a source block to a destination block. The ROM 210 may be used to initialize a memory system 102, such as a flash memory device. The memory system 102 that is initialized may be referred to as a card. The host interface 216 may provide the data connection with the host.

FIG. 3 is a block diagram of an alternative memory communication system. In particular, FIG. 3 illustrates multiple memories (NANDs) communicating over busses with a device, which is an application-specific integrated circuit (ASIC) 302 that may include a flash interface module (FIM) 304 and random access memory (RAM) 306. The ASIC 302 may be a chip that communicates with multiple flash memory modules or devices, such as NANDs 308, 314. The FIM 304 communicates data over the flash data bus and communicates control commands over the flash control bus. The NAND1 308 and NAND2 314 are types of flash memory that receive commands and data from the FIM 304 of the ASIC 302. Each of the NAND1 308 and NAND2 314 include controls 312, 318, respectively, for receiving control signals from the ASIC 302. Likewise, each of the NAND1 308 and NAND2 314 include an eXternal Data Latch (XDL) 310, 316, respectively, for receiving data signals from the ASIC 302. Although the flash data bus and flash control bus are illustrated as separate busses that communicate with the XDL 310, 316 and Control 312, 318 of the respective NANDs 308, 314, there may be a singular bus for communication. As described, a bitmap may be stored in the RAM 306 that is based on the FIM 304 accessing a source block from one of the NANDs 308, 314. The bitmap stored in the RAM 306 is utilized for compaction by copying the source block to a destination block from one of the NANDs 308, 314.

Figure 4:
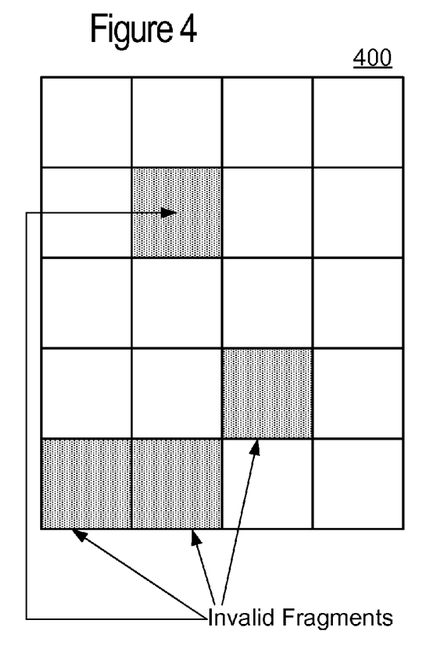
FIG. 4 is a diagram representing one embodiment of a source block.

FIG. 4 is a diagram representing one embodiment of a source block 400 in non-volatile memory. Each box in the source block 400 represents a fragment of data. There are four invalid fragments shown in the source block 400 (shaded/grayed boxes) and the remaining 16 fragments in the source block 400 include valid data. The validity of a fragment may refer to whether the data stored in that fragment is current. An invalid fragment may still include data but that data is expired or has been overwritten into another block. The invalid data may also be referred to as erased; however, the data may still remain in an "erased" fragment until that fragment is rewritten with new/current data.

Figure 5:
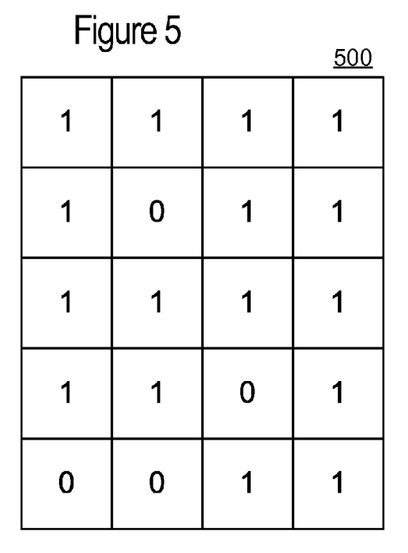
FIG. 5 is a diagram representing one embodiment of a completed compaction bitmap.

FIG. 5 is a diagram representing one embodiment of a completed compaction bitmap. The compaction bitmap 500 in FIG. 5 corresponds with the source block 400 in FIG. 4. The entries in the bitmap 500 may indicate whether a fragment (e.g. a 4 KB fragment) in the source block 400 is valid or invalid with a '1' or a '0' respectively. The bitmap 500 illustrates that there are four invalid data fragments (value=0) and the remaining fragments include valid data (value=1). There is a one-to-one correspondence to the bitmap entry location and the fragment location in the source block. In one embodiment, the bitmap 500 may be maintained in static random-access memory ("SRAM") and populated as the compaction progresses. In other words, the bitmap is generated on the fly and only stored/maintained until a transfer from the source block to the destination block is completed. Storage and maintenance in SRAM allows for the bitmap to be accessed quickly and it may also be discarded once the transfer or compaction is complete. In other words, the bitmap is not persistent and is generated/populated when needed for a compacting valid data from a source block to a destination block. A fully populated bitmap may be read to copy valid fragments to the destination block. Accordingly, the invalid fragments in the source block 400 are not transferred to a destination block as illustrated by the '0' values in the bitmap 500.

There may be a control page which is an index table for a memory block or memory blocks. The control page may be an index of the logical to physical address translation. The control page or index table may include the logical block addresses ("LBA") which may specify the physical location of blocks of data stored on a memory device. Standard LBA may merely be a linear addressing scheme where blocks are located by an integer index, with the first block being LBA 0, the second block being LBA 1, etc. The LBA values may be stored as a control page that is referenced to identify a location of data. The control page may further indicate whether fragments from a block are valid or invalid. References to the control page may be referred to as senses and require processing time. Minimizing references to the control page for the memory device can improve the overall speed and efficiency of the memory device.

The algorithm for populating the bitmap attempts to be as efficient as possible by minimizing data page senses, fragment transfers, control page senses, and control page transfers. In a system where the available SRAM is limited, control pages may be read from the flash memory; however, this may be an expensive operation that requires processing power and time. As described, the bitmap based optimized fragmented block compaction algorithm may leverage the locality of the access pattern. In particular, certain fragments may be addressed by the same control page, which can be leveraged to minimize the number of times that a particular control page must be accessed.

Figure 6:
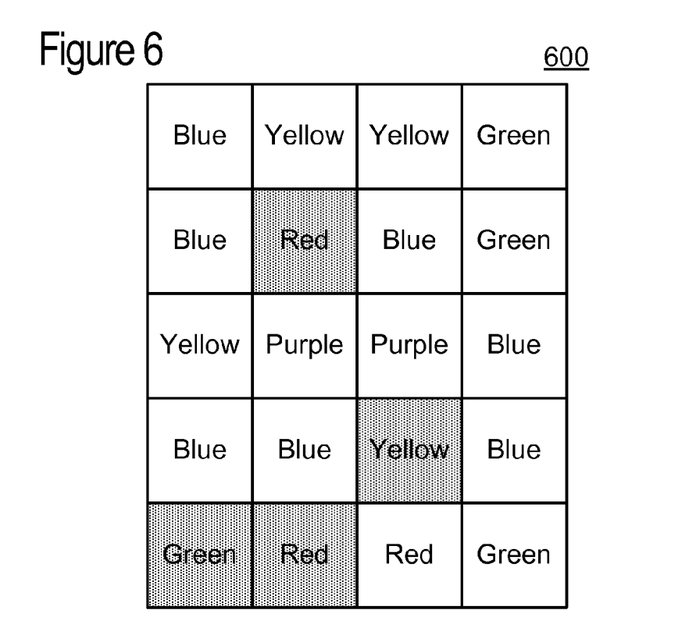
FIG. 6 is a diagram representing one embodiment of a source block showing control page groupings.
Figure 12:
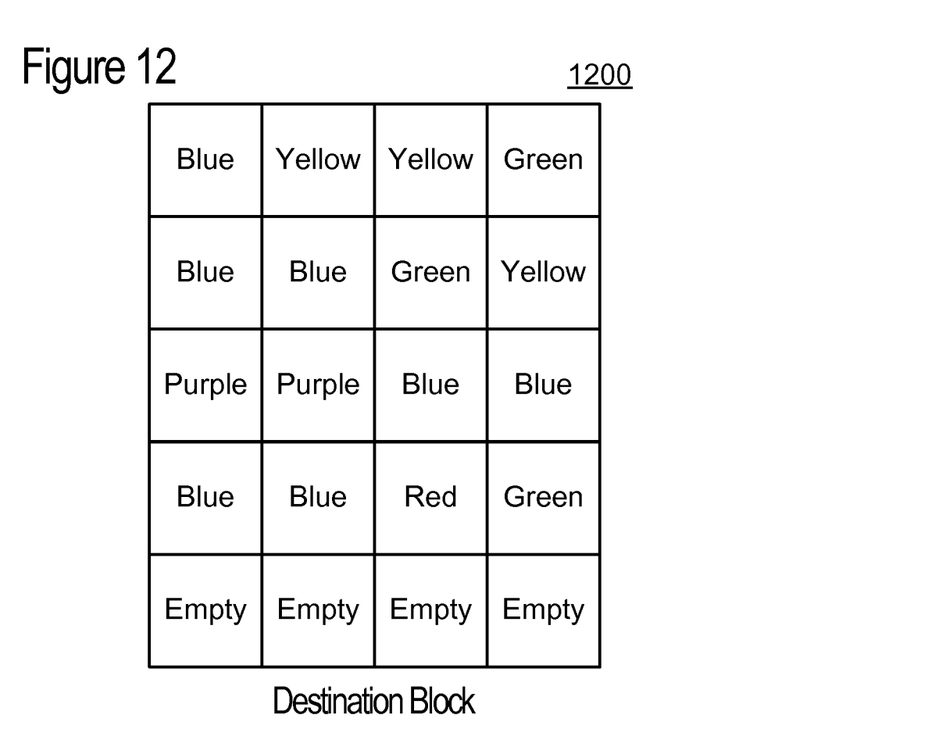
FIG. 12 is a diagram of a destination block 1200.

FIG. 6 is a diagram representing one embodiment of a source block 600 showing control page groupings. In particular, certain fragments may be addressed by the same control pages. The source block 600 illustrates fragments from the same control pages by colors. Accordingly, FIGS. 6 and 12 illustrate that a fragment of a block may be associated with a color. In other words, all the blue fragments are from the same control page. Likewise, all the red fragments are from the same control page, which may be a different control page from the control page for the blue fragments. Likewise, the green, yellow, and purple fragments represent different control pages, respectively. As described, since certain fragments are referenced by the same control page, that information can be leveraged to minimize calls to that control page. Once a particular control page is referenced, all valid data that is addressed in that control page is filled in on the bitmap.

The control pages may be stored in separate or different locations. For example, the control pages illustrated in FIG. 6 (blue, yellow, green, red, purple) may be part of a group of control pages, but the physical or logical storage of each of these control pages is in a different location. In one embodiment, the control pages are each indexes or maps that list the logical-physical mapping for locations where valid data is stored.

Figure 7:
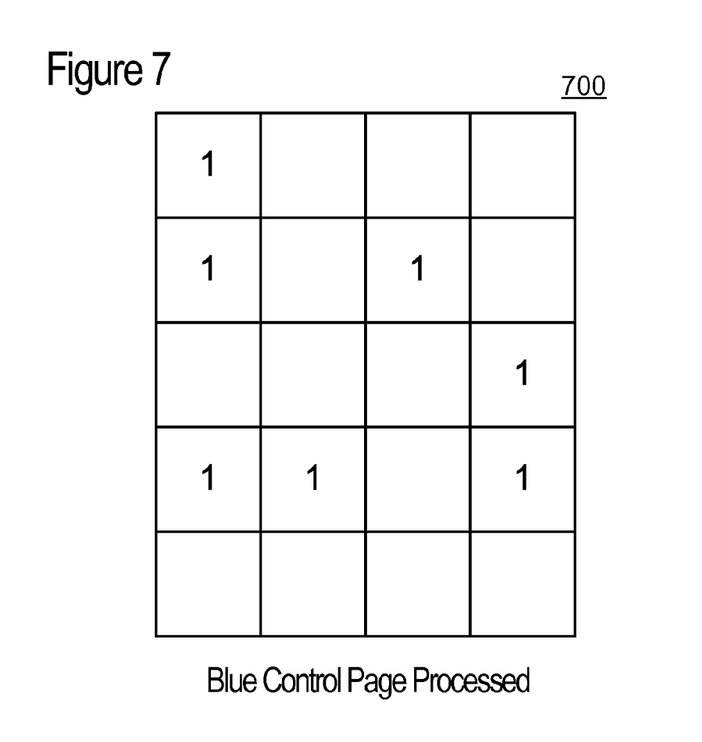
FIG. 7 is a diagram representing one embodiment of a compaction bitmap 700 that references source block from FIG. 6.

FIG. 7 is a diagram representing one embodiment of a compaction bitmap 700 that references source block 600 from FIG. 6. In particular, the bitmap 700 illustrates a first step of the optimized compaction algorithm. The algorithm may start by sensing the first data page in the source block 600 and reading out the first fragment to process. Upon processing the first fragment, the appropriate control page is read in. Accordingly, the first data page in the source block 600 is addressed by the blue control page. The blue control page is then referenced and all valid data from the blue control page is identified and recorded in bitmap 700 as shown. Accordingly, bitmap 700 is shown after the blue control page is processed. All the valid data that is associated with the blue control page is labeled with a '1' to indicate valid data in order to populate the bitmap 700. In one embodiment, the processing of a control page may only reveal valid data. If the control page only includes valid data, then processing of the control page will not identify any invalid data, even if that invalid data was previously addressed by the control page. When a fragment is invalid, that state may only be identified by reading that fragment in the source block.

A first feature of the optimization is that fragments that have a bitmap entry marked need not be processed again. Subsequently other fragments are processed or transferred out, and their corresponding control pages are processed to further populate the compaction bitmap. The optimization algorithm efficiently populates the bitmap by avoiding repetitive reads.

A second feature of the optimization is that the least filled bitmap row is the next row to be sensed. Sensing the lease processed page may yield the most information for filling out the maximum number of bitmap entries.

Following on the example in FIGS. 6-7, the first row is processed in the source block 600. Accordingly, the blue control page is processed (first element in the first row). The remainder of the first row is then processed. If a fragment already has a corresponding entry in the bitmap populated, then that fragment does not need to be processed again. The next unpopulated fragment from the first row is the yellow control page. As described, the source block 600 includes the fragments of data and the bitmaps (e.g. 700 or 800) include corresponding entries that are populated, and when this description refers to a fragment or a block that is populated or filled, that reference actually is referring to that fragment's corresponding entry in the bitmap.

Figure 8:
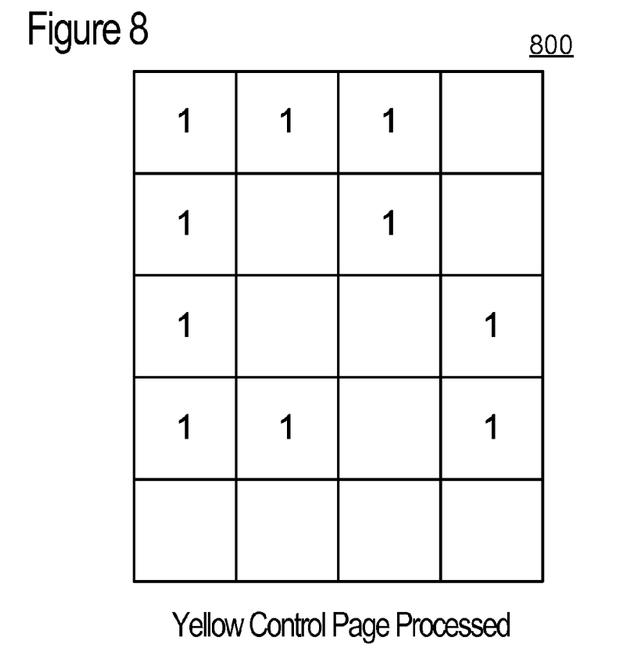
FIG. 8 is a diagram representing the population of a compaction bitmap that references source block from FIG. 6.

Next the processing is of the yellow control page which is the second element in the first row. FIG. 8 is a diagram representing the population of a compaction bitmap 800 that references source block 600 from FIG. 6. In particular, bitmap 800 is an embodiment of bitmap 700 after the yellow control page is processed. Although the fragment that is processed is the second element of the first row, upon processing the yellow control page, the third element of the first row is also populated because it was listed in the yellow control page as being valid. Accordingly, the compaction bitmap 800 identifies both elements two and three of the first row as valid. In addition, the first fragment of row three is labeled as valid data in the bitmap 800.

Figure 9:
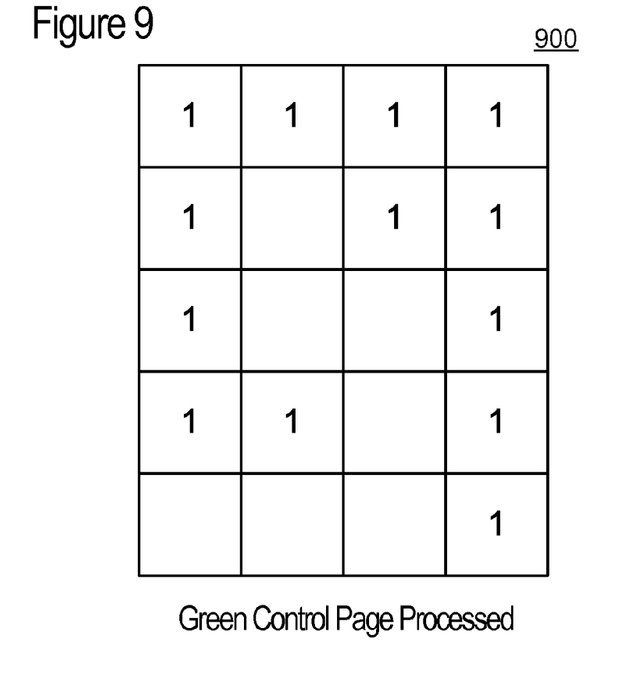
FIG. 9 is a diagram representing the further population of a compaction bitmap that references source block from FIG. 6.

Finally, the remaining fragment of the first row of source block 600 is processed. The last fragment in the first row of the source block 600 is from the green control page. Accordingly, all the valid fragments addressed in the green control page are populated in the bitmap shown in FIG. 9. FIG. 9 is a diagram representing the population of a compaction bitmap 900 that references source block 600 from FIG. 6. The bitmap 900 is an embodiment of the bitmap 800 after the green control page is processed.

FIGS. 7-9 illustrate the algorithm processing each of the fragments from the first row of the source block 600. Upon completion of that processing, the second feature of the optimization may be utilized for identifying the next page to sense. As discussed, the second feature of the optimization is that the least filled bitmap row is the next row to be sensed.

A loop may be run to check how much each bitmap row has filled up against a threshold value. The threshold value may be initially set to a low value (e.g. 1) that can be incremented. For the subsequent page read, the source block page that is read may correspond to the bitmap row with a fill count (i.e. the number of entries marked '1') that is less than the threshold value. The filling of the bitmap may also be described as the populating of the bitmap. If all the rows are equally filled, the tie may be broken at random and any one row is chosen. In the next iteration (after a pass of checking all bitmap rows) the threshold value may be incremented so that that the next set of bitmap rows is chosen for processing. Accordingly, the least filled (excluding invalid or NULL data) bitmap row is chosen to be sensed.

Figure 10:
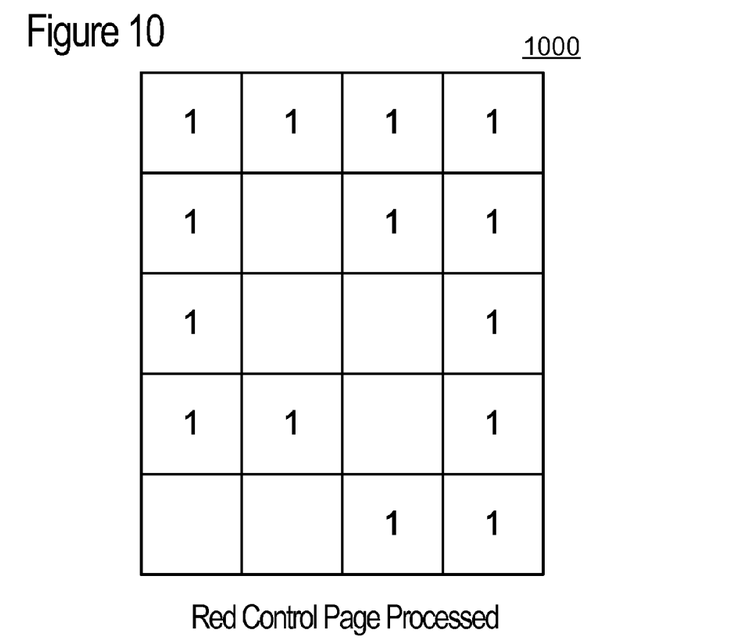
FIG. 10 is a diagram representing the further population of a compaction bitmap that references source block from FIG. 6.

Referring to the bitmap 900, the algorithm determines which row to sense. If the threshold value is 1, then no rows are below the threshold. The threshold may then be incremented and the next iteration compares the fill count of each row with the threshold value of 2. Referring to the bitmap 900, the least sensed row is the last row, which has a fill count of 1, which is less than the threshold value of 2. Accordingly, the last row is sensed for further populating the bitmap and FIG. 10 illustrates the bitmap 1000 after processing the red control page, because the last row includes valid data addressed by the red control page. FIG. 10 is a diagram representing the population of a compaction bitmap 1000 after the red control page is processed.

Figure 11:
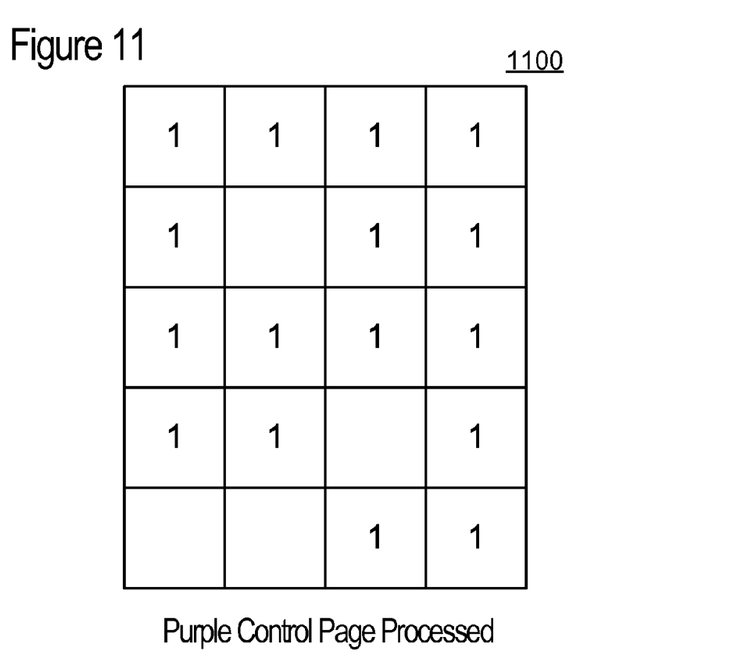
FIG. 11 is a diagram representing the further population of a compaction bitmap that references source block from FIG. 6.

After the red control page is processed as illustrated in bitmap 1000, the second feature of the optimization is utilized for identifying the next row to process. As shown in bitmap 1000, the third row has a fill count of two. When the third row is processed, the valid data that is associated with the purple control page is processed. FIG. 11 illustrates the bitmap 1100 after processing the purple control page. The bitmap 1100 shown in FIG. 11 includes entries for all of the valid data. The system may already know the block's overall valid fragment count, so when the fill count of each row equals the block's overall valid fragment count, the algorithm terminates because all the valid fragments have been identified. The comparison of the fill count with fragment count is further described with respect to FIG. 13.

FIG. 12 is a diagram of a destination block 1200. The destination block 1200 includes the valid data from the source block 600 illustrated in FIG. 6. The bitmap 1100 indicates the valid data and only that valid data is transferred to the destination block 1200. Accordingly, when the valid data is transferred to the destination block 1200 there are several empty fragments that are available for writing. Source block 600 in FIG. 6 illustrated four fragments that included invalid data and as a result, the destination block 1200 in FIG. 12 includes four empty fragments. The valid fragments from the source block 600 may be copied to the destination block 1200 in order (as shown) or in a different order. The empty fragments may indicate free to write space. Since the bitmap has information about which are the valid fragments in the block, only those fragments are transferred out to the SRAM buffer (aka copy buffer) and written out to a page of the destination block.

As a third potential optimization feature of the algorithm, the writing may occur when a full page worth of valid fragments are accumulated in the copy buffer. In other words, the copy buffer may be flushed only when all fragments from the source block are processed and identified in the bitmap.

Figure 13:
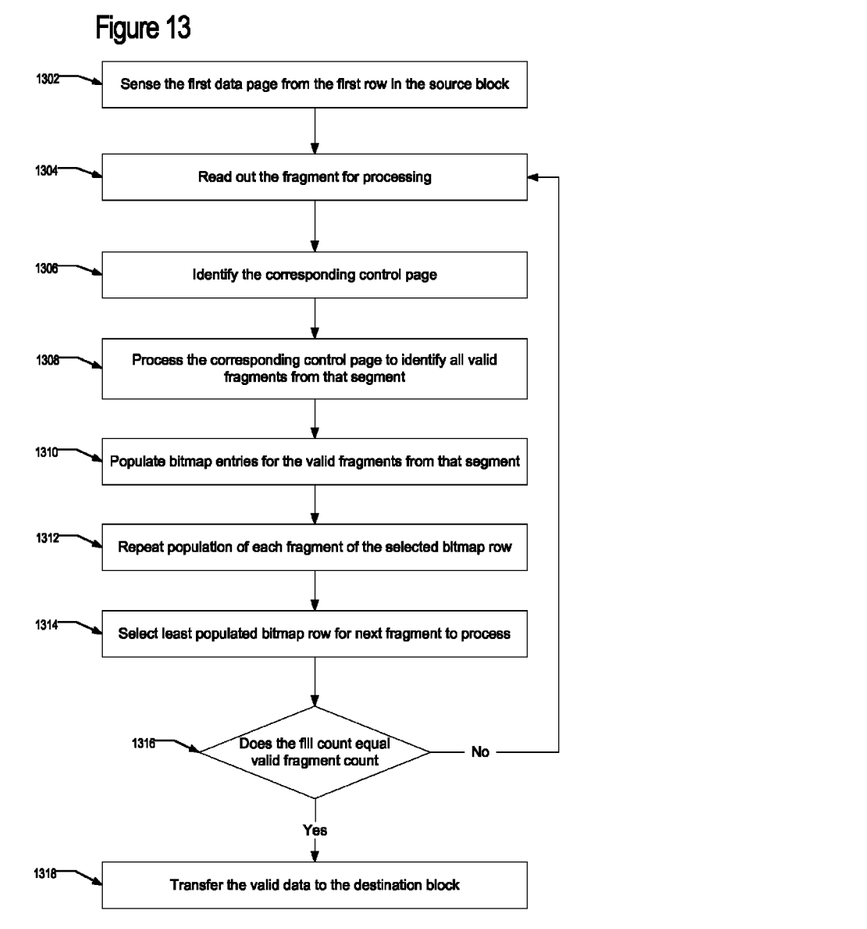
FIG. 13 is a flowchart illustrating an exemplary optimization algorithm using a compaction bitmap.

FIG. 13 is a flowchart illustrating an exemplary optimization algorithm using a compaction bitmap. FIGS. 6-12 illustrate bitmap compaction for transferring valid data from a source block to a destination block. Likewise, FIG. 13 illustrates the process for the bitmap compaction. In block 1302, a first data page in the source block is sensed. In block 1304, the fragment is transferred out for processing. In block 1306, a corresponding control page is identified for the fragment that is transferred out. As described with respect to FIG. 6, each fragment may be associated with a particular control page (represented by colors in FIG. 6). In block 1308, the corresponding control page is processed to identify all valid fragments from that control page. Processing all valid fragments from a particular control page together may provide additional efficiency by limiting future accesses of that particular control page. As part of the processing in block 1308, the bitmap is populated for the valid fragments from that control page in block 1310.

Each of the fragments from the selected row are processed. If the fragment being processed is invalid, that fact is identified when the associated control page does not include the reference to that fragment. If the fragment is valid, then the associated control page will identify that fragment as having valid data. For each of the fragments in the selected row (e.g. the first row in the first iteration), the corresponding or associated control page is identified for determining validity of that block. In addition, all other fragments referenced by that control page are populated in the bitmap. Accordingly, the process iterates for each (unprocessed) fragment in the selected row in block 1312. If a fragment from the selected row has already been populated in the bitmap (e.g. by a previous iterations processing of the corresponding control page), then that fragment is skipped. As mentioned, a first optimization feature is that fragments with a corresponding bitmap entry already populated do not need to processed again. FIG. 8 discussed above, skips the third element of the first row because it was already populated when the yellow control page is processed as part of the processing of the second element of the first row.

A second optimization feature discussed above is that after an entire row has been processed, the selection of the next row for processing is based on the number of populated entries in the bitmap. In particular, the bitmap is analyzed and the least populated bitmap row is selected for the next fragment to process in block 1314. By processing the least populated bitmap row the algorithm maximizes the chances of filling in the most bitmap values. When the bitmap is filled in, a fill count is maintained for the bitmap. In addition, the number of valid fragments is also known. When the fill count equals the valid fragment count in block 1316, the bitmap is full and the valid data is transferred to the destination block in block 1318. When the fill count does not equal the valid fragment count in block 1316, the algorithm iterates and the next fragment is processed.

As described, the bitmap may be stored in SRAM for quicker access and because it may be discarded after each use. The SRAM size requirements for the bitmap may be based on the block size. If the block size in megabytes is B, then size of the compaction bitmap will be (B*1024/4) bits. If the count is stored for each bitmap row, total counter memory is (3 bits*# Pages per block). For a block of size 8 MB with 128 pages, total SRAM required per above calculation is 304 bytes.

The following table illustrates a comparison of the optimized compaction with a regular compaction. The experiment below utilized a 24 nm×2 memory (64 pages per single level cell block). The drive was random filled with 4 KB fragments in the LBA ranges shown in the table below.

TABLE 1

Comparison of the Optimized Compaction

| LBA Range | Regular Compaction | | Optimized Compaction | |
| --- | --- | --- | --- | --- |
| | Total #Senses | Total #Fragment Transfers | Total #Senses | Total #Fragment Transfers |
| 8 GB | 64 | 512 | 39 | 226 |
| 4 GB | 64 | 512 | 39 | 155 |
| 2 GB | 64 | 512 | 38 | 206 |

Table 1 shows the reduction in the number of senses per page and the fragments that need to be read and processed in the optimized bitmap scheme. Accordingly, the optimizations described above may result in fewer senses and toggles. In particular, the algorithm may optimize the number of senses required per page, optimize the number of control page reads, and optimize the number of fragments that have to be processed during fragmented block compaction. This is partially accomplished by leveraging the locality of the access pattern as described.

As used herein, "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a processor, memory device, computer and/or machine memory.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

We claim:

1. A flash memory device comprising:
a non-volatile storage having an array of memory blocks storing data; and
a controller in communication with the non-volatile storage, wherein the controller is configured to:
  maintain a compaction bitmap that comprises a plurality of entries that represent corresponding fragments of a source block;
  populate a first row of the bitmap by processing a first row of the source block, wherein for the processing of the first row, the controller is further configured to:
    select a fragment from the first row of the source block, wherein for the fragment selected, the corresponding entry of the bitmap has not been populated;
    identify a control page associated with the selected fragment; populate each entry in the bitmap that corresponds with the identified control page; and
    repeat the processing for a next selected fragment from the first row of the source block until the first row of the bitmap has been populated; and
  select an additional row of the source block, wherein the additional row selected for processing corresponds with a row from the bitmap that is least populated.

2. The device of claim 1 wherein the entries of the compaction bitmap indicate whether a corresponding fragment from the source block is valid data or invalid data.

3. The device of claim 2 wherein the control page identifies valid data for a plurality of the fragments.

4. The device of claim 1 wherein for the populating of the additional row, the controller is further configured to:
select a fragment from the additional row of the source block, wherein the fragment selected has not been populated in the corresponding entry of the bitmap;
identify a control page associated with the selected fragment;
populate each entry in the bitmap that corresponds with the identified control page; and
repeat the processing for a next selected fragment from the additional row of the source block until the additional row has been populated.

5. The device of claim 1 wherein the controller is further configured to:
identify, via the compaction bitmap, valid data for transfer from the source block to transfer to a destination block.

6. The device of claim 5 wherein the controller is configure to:
   transfer the valid data to the destination block when the bitmap contains a complete set of entries.

7. The device of claim 5 wherein the controller is further configured to:
   complete the compaction bitmap when the number of filled entries in the bitmap equals a valid fragment count of the source block.

8. The device of claim 5 wherein the source block and the destination block are each one block from the array of memory blocks storing data.

9. The device of claim 1 wherein the compaction bitmap is stored in a random access memory ("RAM").

10. The device of claim 9 wherein the compaction bitmap is maintained in the RAM only until the compaction bitmap is used for a transfer of data.

11. A memory system comprising:
   a random access memory ("RAM");
   a non-volatile storage having an array of memory blocks storing data; and
   a controller in communication with the blocks and RAM, the controller configured to:
      generate a compaction bitmap that is maintained in the RAM, the compaction bitmap comprising a plurality of entries that each correspond with fragments from a source block;
      populate the compaction bitmap by selecting a least filled row from the bitmap and for each of the fragments that do not have a corresponding populated entry in the bitmap, reference an associated control page;
      reading the associated control page and populating each entry in the bitmap for the fragments referenced by the associated control page;
      complete the compaction bitmap when a number of filled entries in the bitmap equals a valid fragment count of the source block; and
      utilizing the compaction bitmap for identifying the valid data from the source block to transfer to a destination block upon completion of the compaction bitmap.

12. The memory system of claim 11 wherein the associated control page comprises a mapping listing logical addresses for valid data.

13. The memory system of claim 11 wherein each of the plurality entries identifies whether a corresponding fragment includes valid data or invalid data, and further wherein a populated entry of the bitmap comprises an entry that is identified as having either valid data or invalid data.

14. The memory system of claim 13 wherein the completion of the compaction bitmap comprises populating each of the entries of the compaction bitmap as having either valid data or invalid data.

15. The memory system of claim 11 wherein the RAM comprises a static RAM ("SRAM") and the compaction bitmap is maintained in the SRAM until the valid data identified in the bitmap is transferred to the destination block.

16. The memory system of claim 11 wherein the source block and the destination block are each one block from the array of memory blocks storing data.

17. The memory system of claim 11 wherein the valid fragment count of the source block comprises a number of fragments with valid data.

18. The memory system of claim 11 wherein the control page identifies valid data for a plurality of the fragments.

19. The memory system of claim 11 wherein to populate the bitmap, the controller is further configured to:
   select a fragment from the selected row of the source block, wherein the corresponding entry of the bitmap that corresponds with the fragment selected has not been populated;
   access the control page associated with the selected fragment;
   populate each entry in the bitmap that corresponds with valid data identified in the accessed control page;
   repeat the population for a next selected fragment from the selected row of the source block until the selected row of the bitmap has been populated; and
   select a next least populated row for populating the bitmap and iteratively repeat the population of the bitmap for that row.

20. A method for compaction in flash memory comprising:
   in a non-volatile storage device having a controller and blocks of memory, the controller:
      maintains a compaction bitmap that is populated to identify whether corresponding fragments from a corresponding source block are valid or invalid;
      selects a least populated row from the compaction bitmap to be processed;
      processes each unpopulated entry of the selected row by accessing an associated control page, wherein each entry of the bitmap that is referenced in the associated control page is populated;
      iteratively repeats the selection and processing of another least populated row until the compaction bitmap is fully populated; and
      initiates a compaction transfer of the valid data from the source block to a destination block when the compaction bitmap is fully populated.

* * * * *